Jan. 9, 1968          W. T. SWINEHART          3,362,423
CONTROL VALVE WITH FLUID DIVERTER
Filed June 29, 1964                  2 Sheets-Sheet 1

INVENTOR.
WILLIAM T. SWINEHART
BY
ATTORNEY

Jan. 9, 1968   W. T. SWINEHART   3,362,423
CONTROL VALVE WITH FLUID DIVERTER
Filed June 29, 1964   2 Sheets-Sheet 2

INVENTOR.
WILLIAM T. SWINEHART
BY
ATTORNEY

United States Patent Office 3,362,423
Patented Jan. 9, 1968

3,362,423
CONTROL VALVE WITH FLUID DIVERTER
William T. Swinehart, Scotts, Mich., assignor to Pneumo Dynamics Corporation, Cleveland, Ohio, a corporation of Delaware
Filed June 29, 1964, Ser. No. 378,864
4 Claims. (Cl. 137—83)

The present invention relates generally to fluid control valves and more particularly to a control valve having a fluid diverter mounted therein for receiving fluid from a fluid supply means and diverting the same to fluid receiving means, the latter communicating with an external power unit or mechanism controlled by the fluid.

A primary object of the present invention is to provide a fluid control valve capable of achieving high flow and pressure recovery at relatively low fluid flow conditions.

A further object of the present invention is to provide a fluid control valve possessing a high level of contamination tolerance.

A further object of the present invention is to provide a fluid control valve designed for accurate operation at extreme fluid temperature conditions.

A still further object of the present invention is to provide a fluid control valve of highly simplified construction and comprised of but few parts thereby resulting in economy of manufacture and providing inherent reliability.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
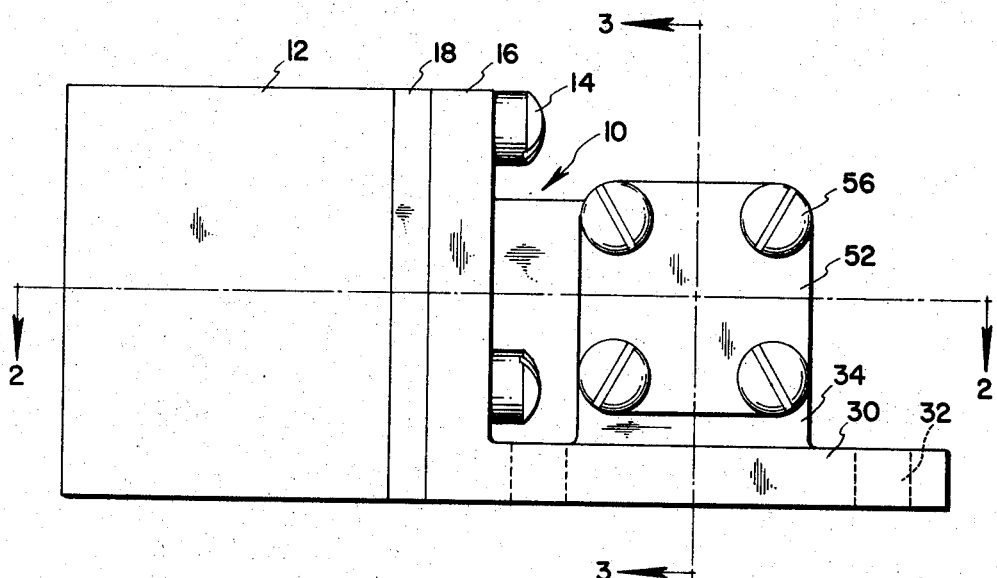
FIG. 1 is a side elevational view of the fluid control valve of the present invention.

Referring now in more detail to the drawings, where like reference numerals are used to indicate like parts, the fluid control valve of the present invention comprises a main housing 10 and a torque motor housing 12 secured thereto by bolts commonly designated at 14. The housings 10 and 12 are provided with contiguous flanges 16 and 18, respectively, preferably integrally formed therewith, with the bolts 14 extending through openings in the flange 16 into threaded openings in the flange 18.

Figure 2:
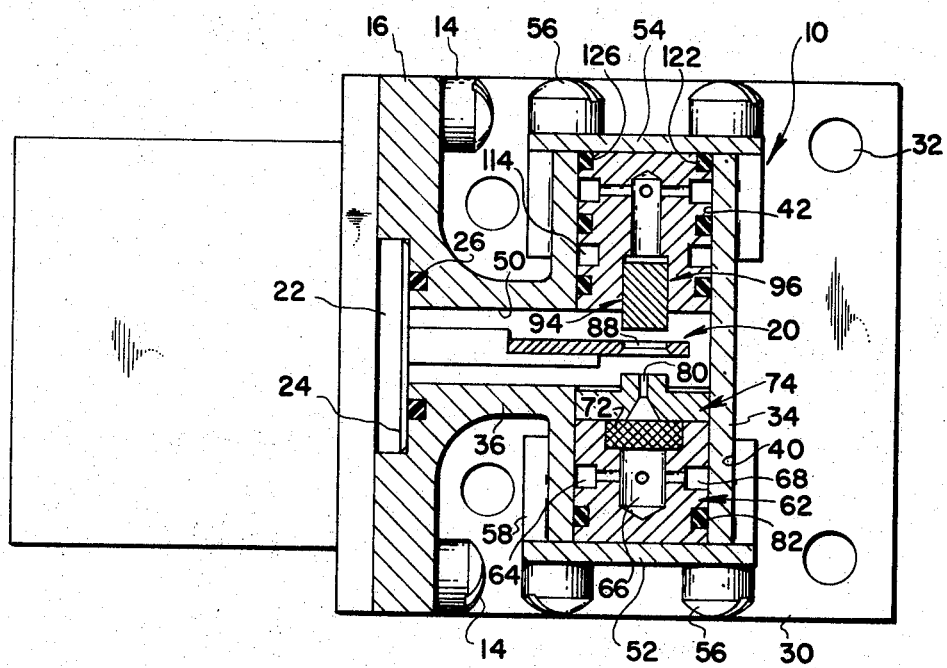
FIG. 2 is a longitudinal sectional view taken on line 2—2 of FIG. 1.
Figure 3:
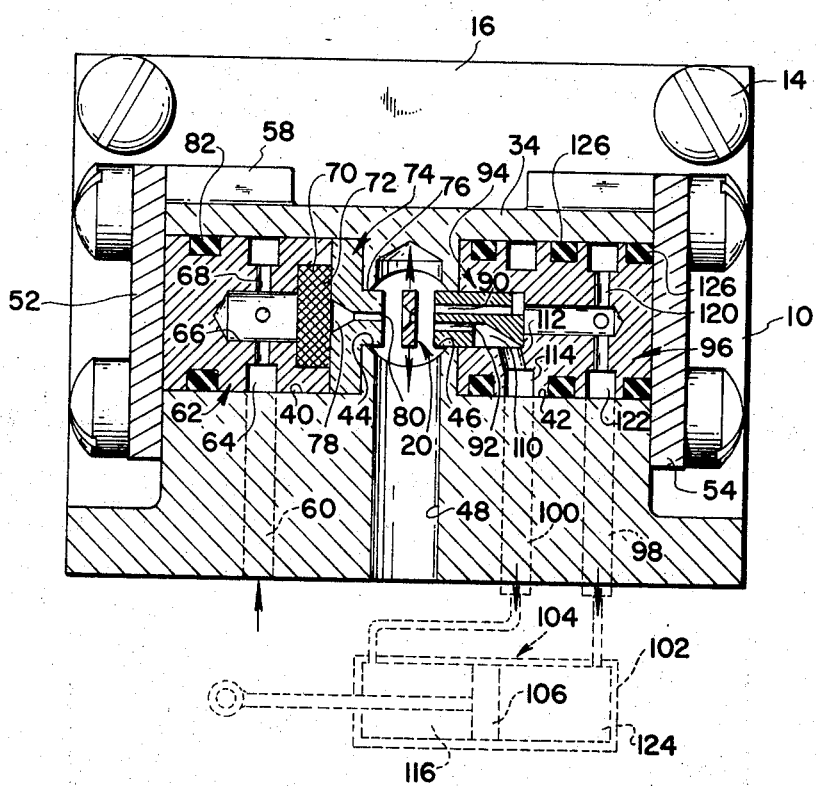
FIG. 3 is a transverse sectional view, taken on line 3—3 of FIG. 1.

The torque motor housing 12 has mounted therein a torque motor assembly (not shown) which forms no part of the present invention, being of conventional, commercially available construction of the type shown, for example, in U.S. Patent No. 3,081,787, issued in the name of J. W. Meulendyk and entitled "Hydraulic Control Valve." The torque motor functions in a well-known manner in response to an electrical control input signal for variably positioning a control member for proportionally directing fluid supplied thereto into a pair of receiving passages adjacently disposed to such control member. Referring to FIGS. 2 and 3, the control member in the present invention comprises a relatively thin, elongated fluid diverter member generally indicated at 20. The diverter 20 extends through a diverter mounting plate 22 mounted in a recess 24 formed in the main housing, with a sealing ring 26 being provided for sealing such mounting. In a well-known manner, the torque motor is effective to move the diverter member 20 in a direction and with a magnitude dependent upon the direction and magnitude of the input signal. Suitable electrical connections (not shown) lead from the torque motor assembly to the signal-producing electrical control means.

Referring to FIG. 3, for example, the diverter 20 moves in response to the input signal in a direction indicated by the arrows, with the diverter being shown in FIG. 3 in a null position, that is, the assumed position in the absence of a control signal to the torque motor. The diverter can be moved to such null position by any suitable means, for example a torque rod of the type shown in the above-noted U.S. Patent No. 3,081,787. In such an arrangement, the upper end of the control member is mounted on the torque rod mounted at both ends to the valve housing with torsion thereby being developed in the rod during movement of the control member responsive to the electrical control input signal, with such torsion at the termination of such signal functioning to return the control member, in this case the diverter 20, to a null position. As above noted, such arrangement is conventional and need not be illustrated or further described for a clear understanding of the present invention.

The main housing 10 comprises a base 30 which, in the form shown, is provided with a plurality of openings commonly designated at 32 for mounting the valve on a suitable mounting surface. Extending upwardly from the base 30 and preferably integral therewith is a generally T-shaped housing section 34 the reduced neck portion 36 of which is integrally formed with the mounting flange 16. The housing section 34 is longitudinally bored from opposite ends thereof to form cylindrical openings 40 and 42 which terminate, referring to FIG. 3, relatively adjacent the diverter 20. Relatively smaller openings 44 and 46 are formed in the housing for communicating the cylindrical openings 40 and 42 with openings 48 and 50 formed in the housing and extending normal to the cylindrical openings 40 and 42. The opening 48 extends from slightly above the diverter to the exterior of the valve and functions as a return passage for returning excess fluid to a fluid supply source such as a fluid reservoir or the like. As best shown in FIG. 2, the preferably cylindrical opening 50 extends through the neck portion 36 of the housing section 34 for receiving the diverter 20. The opening 50 is counterbored to form the recess 24 above described for receiving the diverter mounting plate 22.

End plates 52 and 54 are provided for closing the open ends of the cylindrical openings 40 and 42, with the housing section 34 being provided with embossed areas for receiving mounting bolts commonly designated at 56 for rigidly mounting the end plates to the housing section. The embossed areas of the housing have been commonly designated at 58 and it will be understood that each is internally threaded for receiving the mounting bolts 56. In this manner the end plates 52 and 54 can be quickly removed thereby permitting easy access to the valve components mounted within the housing section 34.

Fluid is supplied to the interior of the control valve through a supply passage 60 the outer end of which communicates with a source of fluid supply such as a reservoir or the like (not shown). Fluid is directed from the inner end of the supply passage 60 to the diverter 20 through a supply cylinder generally indicated at 62 disposed in the opening 40. The cylinder 62 is formed with an annular groove or recess 64 aligned with supply passage 60, and fluid is directed from such groove to a longitudinal chamber 66 formed in the cylinder through a plurality of connecting passages commonly designated at 68, there being four such passages in the form shown, spaced ninety degrees from each other.

The open end of the cylinder 62 is counterbored as indicated at 70 for receiving a filter 72 for withholding undesirably large particles from the receiving side of the valve assembly. An orifice plug generally indicated at 74 is disposed within the opening 40 in front of the supply cylinder 62. The orifice plug 74 includes a reduced forward end portion 76 disposed through the opening 44 in the valve housing, with the leading edge of such forward portion terminating relatively adjacent the diverter 20. The orifice plug is formed with a generally funnel-shaped opening 78 the enlarged inlet end portion of which receives fluid from the supply cylinder, with the opening 78 further including a relatively reduced supply orifice 80 disposed generally opposite the opening formed in the diverter 20, with such supply orifice in the form shown being cylindrically shaped.

It will thus be seen that the supply cylinder and orifice plug 74 can be quickly installed or removed from the valve housing merely by removing the end plate 52. It will also be seen that the orifice plug 74 spaces the cylinder 62 within the bore 40 so that the annular groove 64 is automatically aligned with the supply passage 60. An annular seal 82 is disposed in a complemental recess adjacent the outer end of the cylinder for sealing the cylinder in the opening 40.

Figure 4:
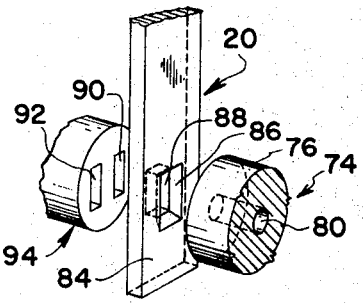
FIG. 4 is a fragmentary perspective view of the transfer element and the supply and receiving passages adjacent thereto.

The diverter 20, as best shown in FIG. 4, includes an outer end portion 84 in which is formed a diverter opening having in the form shown an enlarged inlet portion 86 and a relatively reduced discharge orifice 88. The enlarged inlet portion permits delivery of fluid from the supply orifice to the diverter opening for all positions of adjustment of the diverter. It will be apparent, however, that the diverter opening can be of any suitable shape, e.g. merely straight, as long as such opening accommodates the range of movement of the diverter. In the form shown the inlet portion 86 and the discharge orifice 88 are rectangular in shape and the discharge orifice is adapted to direct fluid into similarly rectangular shaped receiving passages 90 and 92 formed in a receiver plug generally indicated at 94. It will be apparent that the diverter opening and the receiving passages could be shaped other than rectangular as shown.

The diverter 20 is relatively thin in transverse cross-section whereby the fluid passing therethrough traverses a relatively short flow path. It will be noted that such flow path is relatively remote from the torque motor assembly mounted in the torque motor housing whereby such assembly is relatively insensitive to fluid temperature conditions existing at the diverter opening. The relative thinness of the diverter 20 provides distinct advantages over presently available fluid transfer devices of comparable function, for example the jet pipe type. The diverter is of relatively lightweight design and highly responsive to input signals. Moreover, because of such lightweight construction, less current is needed for moving the same. The diverter is quickly moved to its null position at the termination of the input signal, and null shift at changing fluid pressures has been virtually eliminated. The diverter provides excellent flow and pressure recovery at the receiving passages, which is particularly important in low pressure operations. The diverter design permits the valve of the present invention to handle fluid flow rates as low as 10 cubic inches per minute.

The receiver plug 94 is mounted in a receiver cylinder generally indicated at 96 mounted in the cylindrical opening 42. The cylinder 96 is formed with openings for directing the fluid entering the receiving passages 90 and 92 and passing through the receiver plug to outlet passages 98 and 100 formed in the valve body. The latter such passages are adapted to respectively communicate with the opposite ends of a cylinder 102 of an external device such as a hydraulic actuator generally indicated at 104. The latter forms no part of the invention and is merely intended to exemplify one type of external device which can be controlled by the control valve of the present invention. A piston 106 is disposed within the cylinder 102 with the opposite sides of such piston forming with the cylinder variable volume chambers respectively exposed to the fluid pressures within the outlet passages 98 and 100.

The receiving passage 92 is adapted to communicate with the outlet passage 100 through an opening 110 formed in the receiving plug, a connecting passage 112 formed in the cylinder, and an annular groove 114 also formed in the cylinder and aligned with the outlet passage 100. The receiver plug 94 is beveled at the bottom of the opening 110 to divert the fluid directly to the connecting passage 112. The fluid received in the receiving passage 92 is thus directed through the outlet passage 100 to chamber 116 at the adjacent side of the piston 106.

The receiving passage 90 communicates with the outlet passage 98 through a longitudinal chamber 118 formed in the receiver cylinder 96, a plurality of connecting passages 120, and an annular groove or recess 122 formed in the periphery of the receiver cylinder, the groove being aligned with the outlet passage 98. Fluid received by the receiving passage 90 thus flows through the outlet passage 98 to the piston chamber 124 at the adjacent side of the piston 106.

It will be seen that the receiver cylinder 96 and the receiver plug 94 can also be quickly installed and removed, merely by removing the side plate 54. A plurality of spaced sealing rings commonly designated at 126 are mounted in complemental grooves formed in the receiver cylinder 96 for sealing the same in the opening 42.

Referring now to the operation of the fluid control valve of the present invention, when the diverter 20 is in its null, FIG. 3 position in the absence of a control signal being directed to the torque motor assembly, the discharge orifice 88 thereof is symmetrically located relative to the receiving passages 90 and 92. Fluid directed to the diverter through the supply passage 60, the supply cylinder 62 and the supply orifice 80 of the orifice plug 74 is thereby directed by the diverter into the receiving passages 90 and 92 in substantially equal quantities thereby creating substantially equal pressure conditions therewithin. The fluid directed to and through the outlet passages 98 and 100 will therefore be at substantially equal pressures, with the piston chambers 116 and 124 similarly being at substantially equal pressures thereby maintaining the piston 106 in its then existing position.

When the torque motor is actuated in response to an electrical control signal, the diverter 20 will be moved away from its null position, with the direction and magnitude of such movement depending upon the direction and magnitude of the control signal. Such movement of the diverter will result in a disalignment of the discharge orifice 88 thereof relative to the receiving passages 90 and 92 whereby a relatively greater quantity of fluid will be directed into one receiving passage relative to the other. Thus, referring to FIG. 3, presuming that the control signal delivered to the torque motor is such as to move the diverter downwardly, a greater quantity of fluid will be directed into the receiving passage 92 relative to the receiving passage 90 thereby resulting in increased pressure in the outlet passage 100 relative to the outlet passage 98. There will thus be created a pressure differential in the piston chambers 116 and 124, with the pressure in this instance being greater in the chamber 116 and forcing the piston to the right. The speed with which the piston 106 moves will depend upon the degree of such pressure differential in the piston chambers 116 and 124, which is dependent upon the direction and magnitude of the electrical control signal to the torque motor.

When the electrical control signal to the torque motor is cut off, the diverter 20 will be returned to its null position through the influence of the torque rod thereby returning the discharge orifice 88 of the diverter to a symmetrical position relative to the stationary receiving passages 90 and 92. Equal pressure conditions will be recreated within the receiving passages 92 and 90 and thus in the piston chambers 116 and 124 whereby the piston 106 will be retained in its new position.

In a similar manner, when the electrical control signal to the torque motor is in an opposite direction, that is, a direction resulting in movement of the diverter 20 upwardly, referring to the FIG. 3 orientation thereof, more fluid will be directed into the receiving passage 90 relative to the receiving passage 92 thereby creating a higher pressure in the piston chamber 124 relative to the piston chamber 116 and causing movement of the piston 106 to the left. Again, the speed of such movement will depend upon the magnitude of the electrical control signal delivered to the torque motor.

It will thus be seen that the objects of the present invention have been achieved. The fluid control valve of the present invention permits accurate handling of relatively low fluid flow rates, with the diverter construction providing excellent flow and pressure recovery at the receiving passages. There are no highly restricted passages formed in the valve thereby providing a relatively high contamination tolerance. Further, the diverter, owing to its relative thinness and lightweight construction, is highly responsive to input signals and permits the valve to accurately operate at relatively lower current ranges. The fluid control valve of the invention is simply constructed and permits ready installation and removal of the valve components from the valve housing. Further, the valve has but one moving part, the diverter itself, thereby providing a valve of inherent reliability.

It will be apparent that variations from the foregoing description will suggest themselves to one skilled in the art without, however, departing from the inventive principles of the invention. For example, the relatively thin and lightweight fluid diverter member could be advantageously employed by mounting the diverter normal to the illustrated position thereof, in other words, in a position wherein the longitudinal plane of the relatively thin diverter is parallel to the axes of the supply and receiving passages. By so orienting the diverter, the need for an opening therein is eliminated and the proportional flow to the receiving passages is effected by movement of the diverter by the disclosed control means in a plane normal to the longitudinal plane of the diverter.

I claim:

1. A fluid control valve comprising a valve housing, fluid supply means for supplying fluid to the interior of said valve housing, said fluid supply means including a supply orifice, a pair of spaced fluid receiving passages in said housing disposed generally opposite to said supply orifice, said receiving passages being adapted to communicate with an external mechanism operated by said fluid, an elongated fluid diverter member mounted in said valve housing in spaced relation to said supply orifice and said receiving passages, said diverter member being relatively thin and having flat, parallel side walls disposed in planes perpendicular to the axes of said supply orifice and said receiving passages, said diverter being formed with a generally funnel-shaped opening, the relatively enlarged inlet portion thereof being disposed in the discharge path of said supply orifice and being of a diameter to receive fluid from the latter during all positions of adjustment of said diverter member, the reduced discharge orifice of said diverter opening being approximately equal in area to the area of each of said receiving passages, and control means for moving said diverter member in a direction parallel to the planes of said side walls thereof, said diverter member thereby delivering fluid proportionately to said receiving passages.

2. The control valve of claim 1 wherein said fluid supply means comprises a supply passage formed in said housing adapted to communicate with a source of fluid supply, a supply cylinder mounted in said housing for receiving fluid from said supply passage, and an orifice plug mounted in said supply cylinder and formed with a supply orifice.

3. The control valve of claim 1 further including a receiver cylinder mounted in said housing, and a receiver plug seated in said receiver cylinder, said receiver plug being formed with said receiving passages, said receiver cylinder being formed with openings for directing fluid from said receiving passages to associated outlet passages formed in said housing, said outlet passages communicating with an external mechanism adapted to be controlled by said fluid.

4. The control valve of claim 1 wherein said fluid supply means comprises a supply passage formed in said housing adapted to communicate with a source of fluid supply, a supply cylinder mounted in said housing for receiving fluid from said supply passage, an orifice plug mounted in said supply cylinder and formed with a supply orifice, a receiver cylinder mounted in said housing, and a receiver plug seated in said receiver cylinder, said receiver plug being formed with said receiving passages, said receiver cylinder being formed with openings for directing fluid from said receiving passages to associated outlet passages formed in said housing, said outlet passages communicating with an external mechanism adapted to be controlled by said fluid.

References Cited

UNITED STATES PATENTS

| | | | |
|---|---|---|---|
| 2,960,995 | 11/1960 | Hague | 137—83 |
| 3,064,682 | 11/1962 | Holybock | 137—83 X |
| 3,223,103 | 12/1965 | Trinkler | 137—83 |
| 3,081,787 | 3/1963 | Meulendyk | 91—3 X |

FOREIGN PATENTS

| | | |
|---|---|---|
| 567,913 | 1/1933 | Germany. |

ALAN COHAN, *Primary Examiner.*